(12) United States Patent
Strelnieks

(10) Patent No.: US 7,546,668 B2
(45) Date of Patent: Jun. 16, 2009

(54) METHOD OF MAKING A CANDLE

(76) Inventor: John Strelnieks, 2432 Pinebark Dr., Indianapolis, IN (US) 46217

( * ) Notice: Subject to any disclaimer, the term of this patent is extended or adjusted under 35 U.S.C. 154(b) by 808 days.

(21) Appl. No.: 11/177,834

(22) Filed: Jul. 8, 2005

(65) Prior Publication Data
US 2006/0006582 A1    Jan. 12, 2006

Related U.S. Application Data

(60) Provisional application No. 60/586,455, filed on Jul. 9, 2004.

(51) Int. Cl.
*B23P 25/00* (2006.01)
*C11C 5/00* (2006.01)

(52) U.S. Cl. .......................... 29/428; 29/458; 29/527.1; 29/527.2; 431/289; 264/275; 249/91

(58) Field of Classification Search ................ 29/428, 29/458, 527.1, 527.2, 557; 431/289, 297; 264/275; 249/91, 93
See application file for complete search history.

(56) References Cited

U.S. PATENT DOCUMENTS

| | | | |
|---|---|---|---|
| 2,122,451 A * | 7/1938 | Irineos ........................ 264/245 |
| 2,274,823 A * | 3/1942 | Candy, Jr. .................... 264/279 |
| 3,108,329 A * | 10/1963 | Chapman ...................... 249/91 |
| 3,180,065 A * | 4/1965 | Churchill ...................... 53/428 |
| 3,724,982 A * | 4/1973 | Davis ......................... 425/117 |
| 3,974,996 A * | 8/1976 | Violet ......................... 249/112 |
| 4,004,773 A * | 1/1977 | Binder ......................... 249/93 |
| 4,487,082 A | 12/1984 | Boron |
| 5,121,835 A | 6/1992 | Grupe |
| 5,277,861 A | 1/1994 | Zilbert |
| 5,353,827 A | 10/1994 | Bouchard et al. |
| 5,683,239 A * | 11/1997 | Cardosi ....................... 431/291 |
| 5,910,005 A * | 6/1999 | Scherr ......................... 431/126 |
| 5,939,005 A * | 8/1999 | Materna ....................... 264/255 |
| 6,090,331 A * | 7/2000 | Schwarz et al. ............. 264/405 |
| 6,153,137 A * | 11/2000 | Youn et al. .................. 264/136 |
| 6,228,304 B1 | 5/2001 | Silbergeld |
| 6,318,557 B1 | 11/2001 | Zehnder |

(Continued)

OTHER PUBLICATIONS

Candlewic Company Brochure, "Snap-away Candle Mold" and "Wedding Candle Mold", Oct. 2, 1982.

*Primary Examiner*—Jermie E Cozart
(74) *Attorney, Agent, or Firm*—Woodard, Emhardt, Moriarity, McNett & Henry LLP

(57) ABSTRACT

Methods and apparatus for making decorative candles include a peg mounted to a mold. A tube with an expanded midsection between an open end and a closed end is mounted onto the peg to form a sealed connection. Candle matter, such as liquid wax, is poured into the mold. After the candle hardens sufficiently, the candle with the tube mounted therein is removed from the mold. A handle is inserted into the tube and forms an expansion seal with the midsection. The handle is attached to a rack wherein the user rotates the candle about its longitudinal axis and/or rotates the rack about its horizontal axis. Candle shaping tools may be attached to the rack and/or held by a carver, and are used to shape the candle. The handle is removed from the tube and a wick and fuel are inserted into the tube. The fuel burns while the candle remains intact.

29 Claims, 14 Drawing Sheets

U.S. PATENT DOCUMENTS

| | | |
|---|---|---|
| 6,412,670 B1 | 7/2002 | Randmae et al. |
| 6,428,310 B1 | 8/2002 | Nicholas G. |
| 6,444,156 B1 * | 9/2002 | Schwarz et al. ............ 264/405 |
| 6,471,899 B2 * | 10/2002 | Daiber et al. ............... 264/238 |
| 6,709,265 B2 * | 3/2004 | Guzman ..................... 431/289 |
| 2007/0003894 A1 * | 1/2007 | Yu .............................. 431/289 |

* cited by examiner

METHOD OF MAKING A CANDLE

This application claims the benefit of U.S. Provisional Application No. 60/586,455, filed Jul. 9, 2004, which is hereby incorporated by reference.

BACKGROUND

In one candle making procedure, a wick is positioned within a candle mold and liquid wax is added to the mold to surround the wick and form a candle. After the liquid wax is solidified, the shaped candle is removed from the candle mold. To burn the candle, the user lights the wick and together the wick and liquid wax are burned to illuminate a surrounding area, destroying the candle itself in the process.

In another candle making procedure, a detachable candle mold is separated from a base plate. Next, a votive glass container is placed over and attached to the base plate. The candle mold is reattached to the base and liquid wax is poured into the candle mold to cover the glass container. After the wax has hardened, the candle with the glass container embedded therein is removed from the mold. A user can insert a votive candle into the glass container and burn the smaller votive candle while leaving the larger candle intact. One potential problem with burning a smaller votive candle is the short duration in which the smaller votive candle will burn compared to a larger candle formed from a comparable mold that burns.

While various techniques have been developed to manufacture a candle quickly or to manufacture a candle with the appearance of a burning wick while maintaining the candle in a decorative shape, there remains a need for improving the appearance of a burning candle while maintaining the decorative candle and improving the accuracy of shaping or forming the decorative candle.

DESCRIPTION OF THE ILLUSTRATED EMBODIMENT

Figure 1:
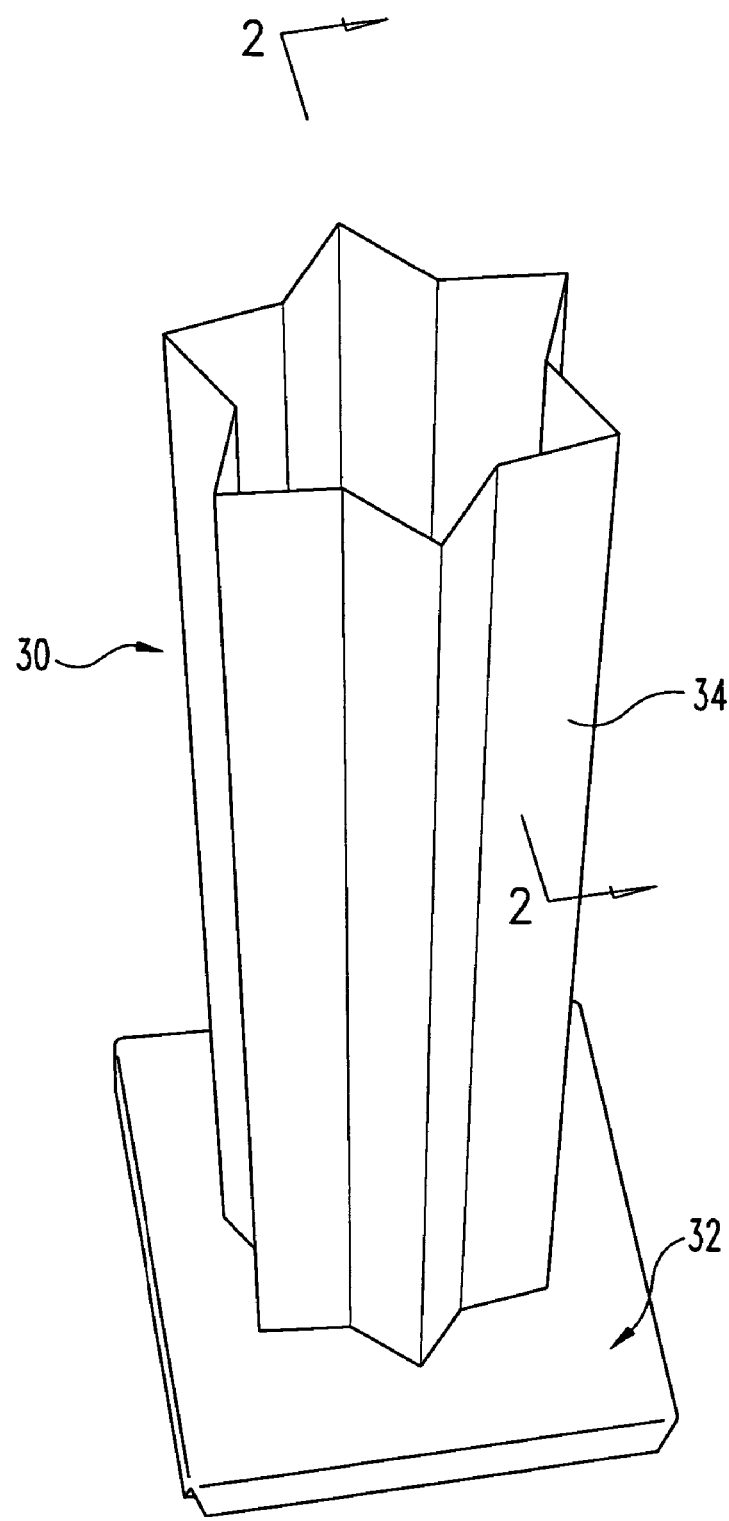
FIG. 1 is a perspective view of an embodiment of a candle mold.

For the purposes of promoting an understanding of the principles of the disclosure, reference will now be made to the embodiments illustrated in the drawings and specific language will be used to describe the same. It will nevertheless be understood that no limitation of the scope of the claims is thereby intended. Any such alterations and further modifications in the illustrated device, and any such further applications of the principles as illustrated herein, are contemplated as would normally occur to one skilled in the art to which the disclosure relates.

The present disclosure generally concerns a set of complementary tools for making decoratively carved wax candles. The candle-making process begins with a candle mold 30 such as that shown in FIG. 1. Mold 30 includes a base plate 32 with one or more sides or walls 34 attached thereto. As shown in FIG. 1, walls 34 form a 12-sided polygon. In other embodiments, there may be a different number of walls or the walls may form another shape, such as a regular or irregular polygon, circle or oval. Sides or walls 34 may be integrally formed with base 32 or may be formed and attached to base 32. As examples, walls 34 may be made of one piece of sheet metal or similar sturdy bendable material the ends of which are connected, may be made of two or more pieces of material welded, glued or otherwise attached together, or may be cast, molded or otherwise created as a single piece. As shown in FIG. 1, base 32 has a rectangular shape; however, in other embodiments it may have another shape.

Figure 2:
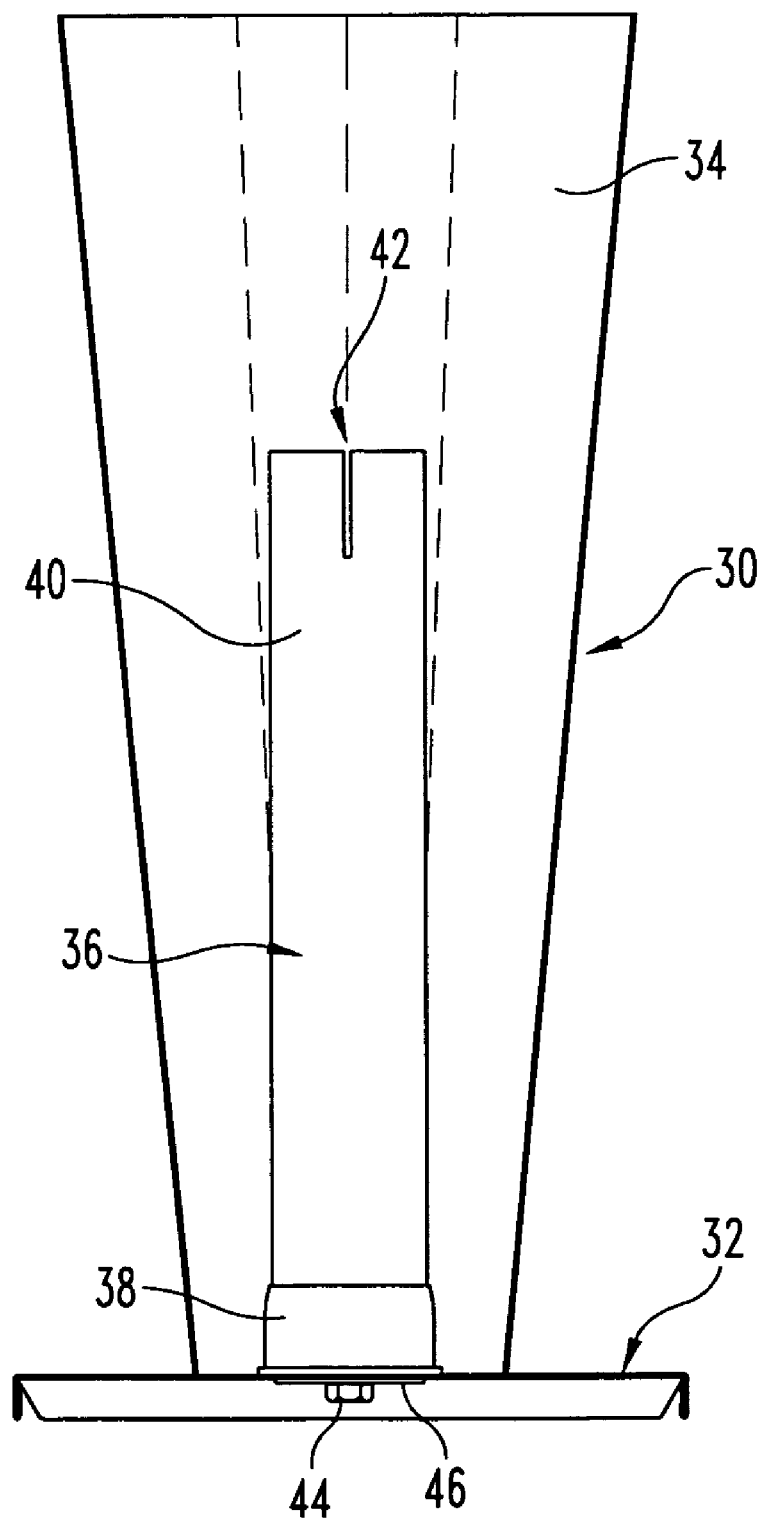
FIG. 2 is a cross-section view of the embodiment shown in FIG. 1, taken along line 2-2 in FIG. 1 and viewed in the direction of the arrows.

As shown in FIG. 2, a peg 36 is attached to base 32 between or within walls 34. Peg 36 includes a first end 38 attached to base 32 and an opposite, second end 40. Second end 40 can include a slot 42 as shown in FIG. 2. In other embodiments, second end 40 may be a solid end. In the illustrated embodiment, peg 36 has a cylindrical shape; however, in other embodiments peg 36 may have a different cross-sectional shape. First end 38 has a larger diameter than second end 40. End 38 may be part of peg 36, or may be a piece attached or connected to it, such as a plastic or rubber washer, cup or seal. In a particular embodiment, the diameter of first end 38 is 1%4 inches and the diameter for second end 40 is 1 1/16 inches. Peg 36 can be made of various materials, including but not limited to wood, metal, or plastic. A screw 44 and a washer 46 may be used to attach first end 38 of peg 36 to base 32. In other forms, there may be a different form of attachment between peg 36 and base 32.

Figure 3:
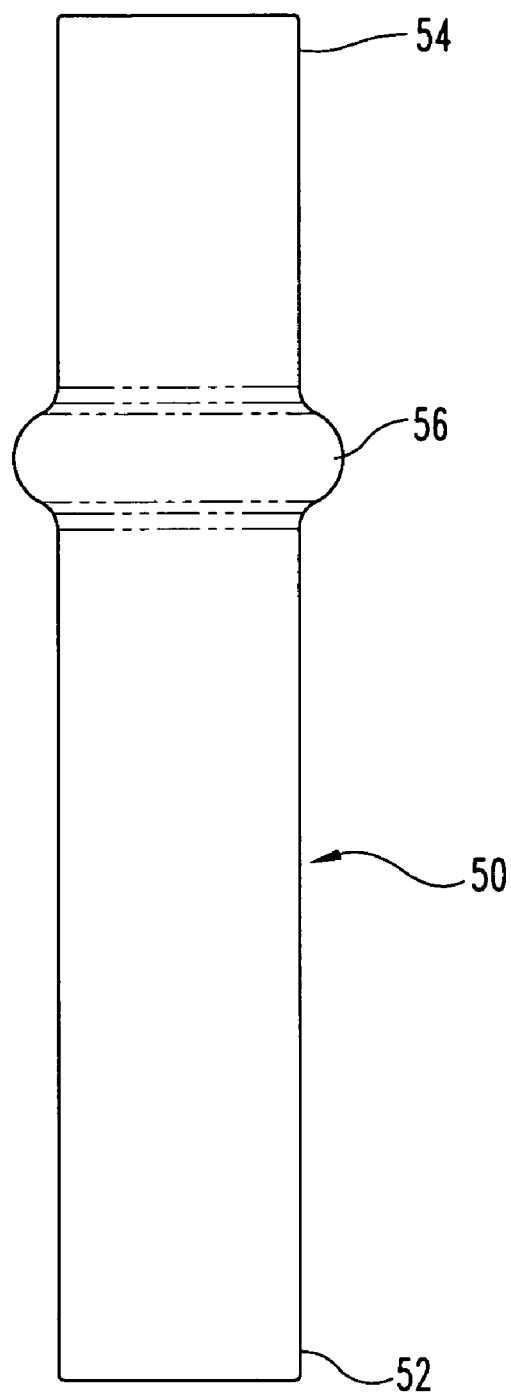
FIG. 3 is a side view of an embodiment of a tube.
Figure 4A:
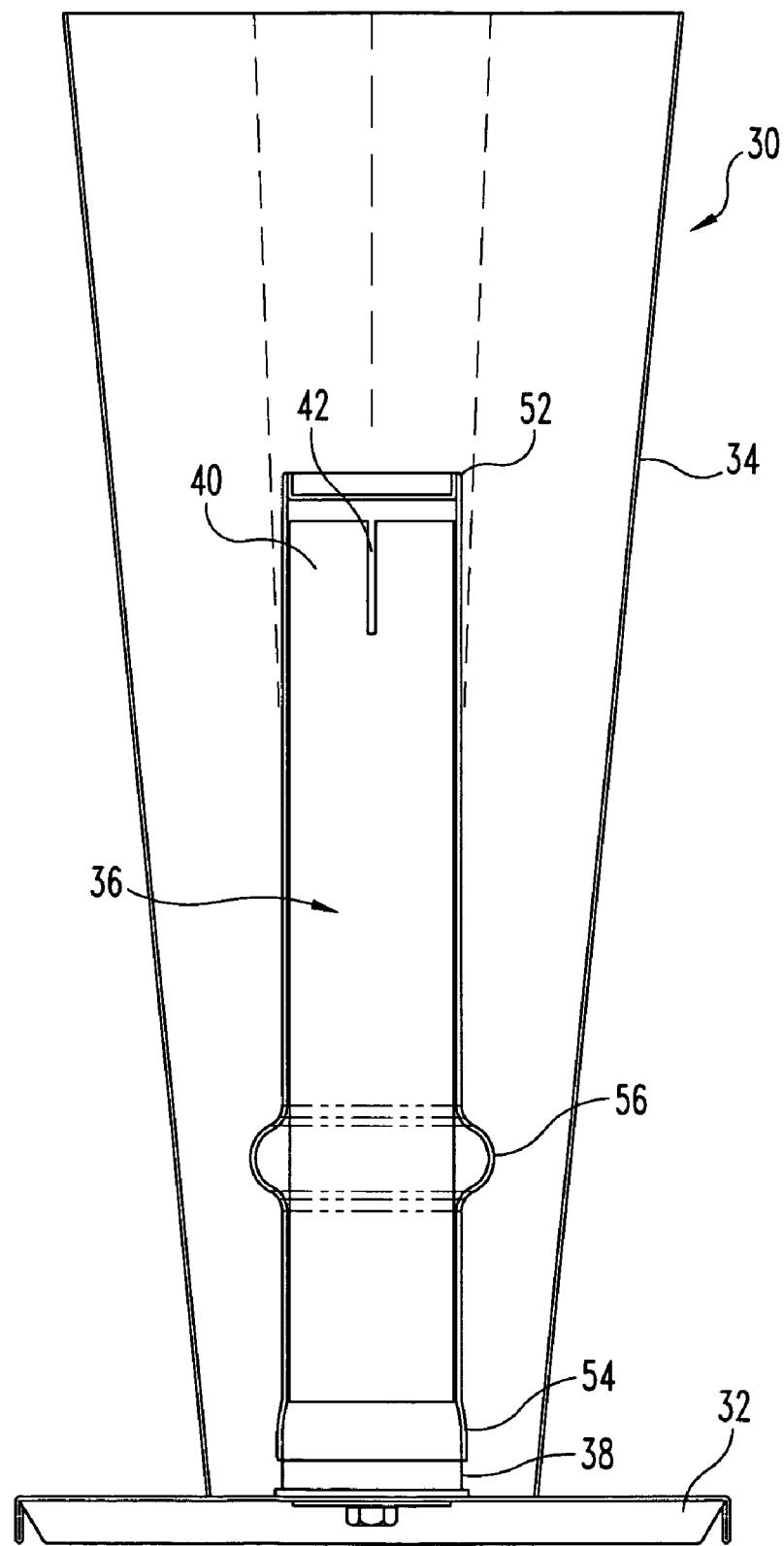
FIG. 4A is a cross-section view of the embodiment shown in FIG. 3 mounted on a post of the embodiment of FIG. 2.

As shown in one embodiment in FIGS. 3-4A, a tube 50 is placed over peg 36. Tube 50 includes a closed end 52 opposite an open end 54. Additionally, tube 50 includes a bulge 56 between ends 52 and 54. In this form, tube 50 has a cylindrical shape; however, in other embodiments tube 50 may have a different cross-sectional shape. Bulge 56 has a slightly larger diameter than that of tube 50. In one particular embodiment, the inside diameter of tube 50 is approximately 1⅛ inches; however, at a point about 2¼ inches measured from open end 54 toward closed end 52, bulge 56 has an inside diameter of about 1⅝ inches over a distance of ¼ inch. The remainder of tube 50 has an inside diameter of 1⅛ inches. In other forms, bulge 56 may be positioned elsewhere along tube 50 nearer to closed end 52 or the mid-section of tube 50. Tube 50 may be made of plastic or other materials not significantly deformed or softened by molten wax or other candle materials. Tube 50 is made of a transparent material in one particular embodiment.

As shown in FIG. 4A, open end 54 of tube 50 fits snugly over first end 38 of peg 36. Thus, the dimension of tube 50 and/or that of end 38 may be selected so that the diameter of end 38 is equal to or slightly larger than the inside diameter of tube 50. In this embodiment, open end 54 and first end 38 form a close fit or friction fit connection. Further, first end 38 forces open end 54 to slightly expand thereby causing a tension force on open end 54. As shown, tube 50 is sized to fit over peg 36, so that peg 36 displaces a substantial portion of the air within tube 50, reducing the volume of air within the tube 50. Tube 50 and peg 36 can be similar in cross-sectional shape. In the illustrated embodiment, tube 50 and peg 36 are each cylindrical in shape; however, in other forms tube 50 and peg 36 may be shaped differently or different from each other.

Figure 4B:
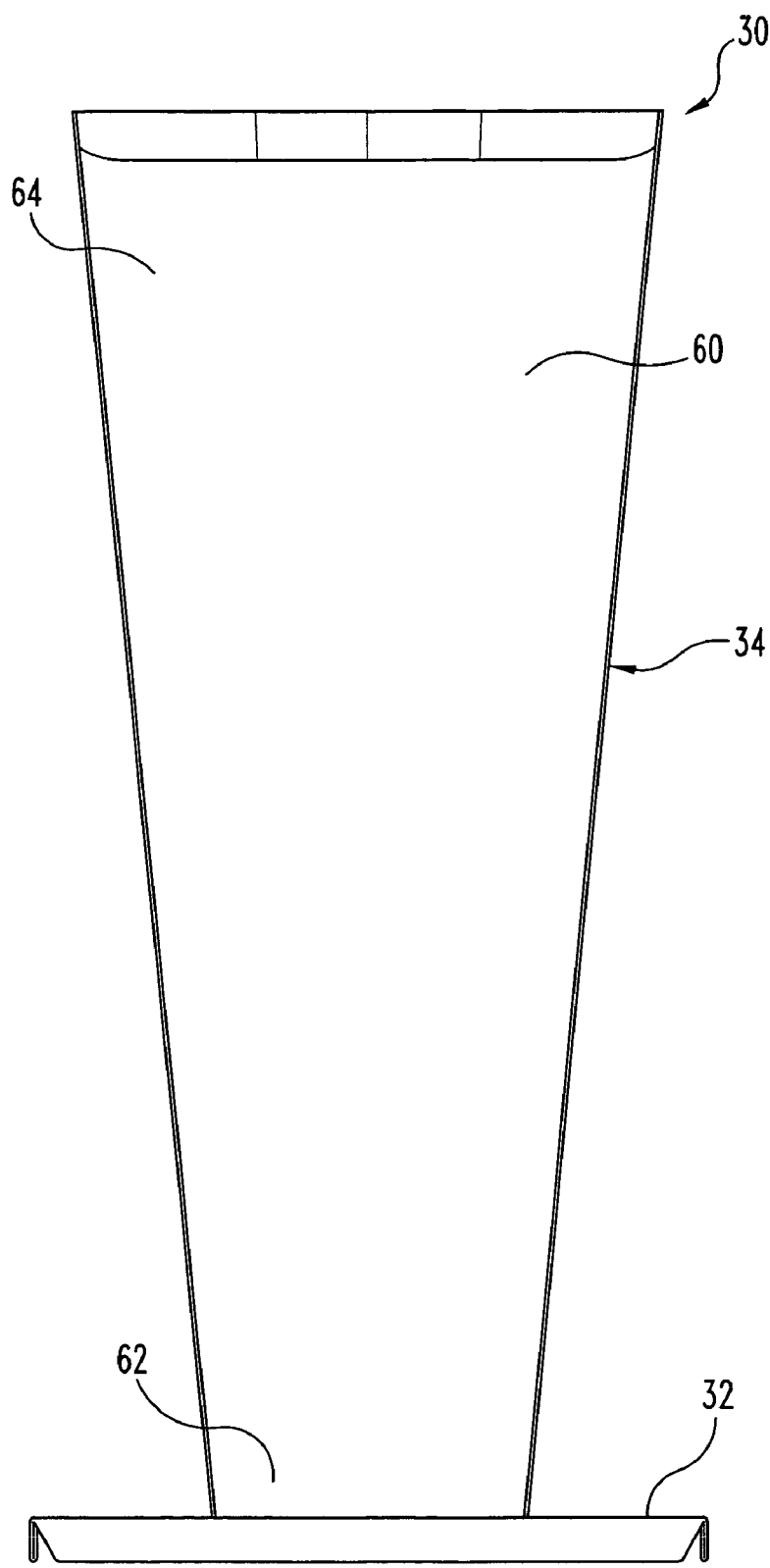
FIG. 4B is a view of the embodiment shown in FIG. 4A with wax added to the candle mold.

To form a candle 60 as shown in FIG. 4B, candle-forming matter, such as melted wax, is poured or otherwise placed into the candle mold 30 until mold 30 is filled to within about ½ inch of the top of the mold 30. In other forms, a different amount of wax may be poured into mold 30 to fill it to a predetermined or desired level. The snug fit or friction fit connection between open end 54 of tube 50 and first end 38 of peg 36 prevents wax from entering tube 50. Further, since peg 36 has displaced a substantial amount of the air within tube 50, only a small amount of air will be heated if melted wax or other hot matter is used, and tube 50 will remain seated on peg 36. It has been found experimentally that if peg 36 or other mechanism is not present to displace air within tube 50, the increase in temperature of such a comparatively larger volume of air via heat transfer from molten wax can cause tube 50 to lift away from base 32, resulting in wax entering open end 54 of tube 50 and/or a failure of tube 50 to be seated within the candle. Of course, if there is little or no heat transfer, such as by using matter that is relatively cooler in a melted state, or by using a relatively small amount of wax, peg 36 may not be necessary. Mold 30 is now left to stand until the matter in it hardens or cools. As wax cools, it shrinks or pulls away from walls 34 and forms an indentation in candle 60 at the top of mold 30 along the longitudinal axis of tube 50. Candle 60 is then removed from mold 30. Tube 50 pulls away from end 38 and remains embedded in the candle 60 because bulge 56 of tube 50, around which candle matter has gathered and cooled or hardened, keeps tube 50 firmly anchored in candle 60. After candle 60 is removed from mold 30, open end 54 of tube 50 is at a top end 62 of candle 60. Candle 60 also includes an opposite bottom end 64.

Figure 5:
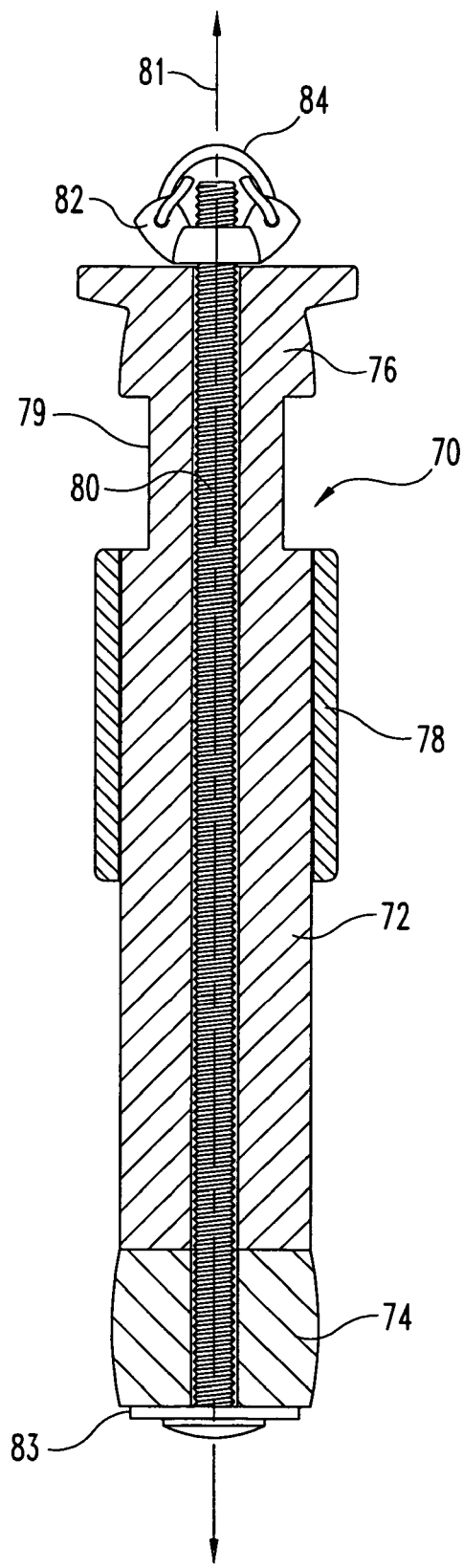
FIG. 5 is a cross-section view of an embodiment of a handle.

As shown in FIG. 5, a handle 70 for holding candle 60 includes a shaft 72 having a first end 74 opposite a second end 76. Shaft 72 is substantially cylindrical in shape; however, in other embodiments shaft 72 may have a different cross-sectional shape. The diameter of shaft 72 is chosen so that shaft 72 will fit within open end 54 of tube 50. Additionally, handle 70 includes an outermost sleeve 78. In this form, sleeve 78 is positioned along shaft 72 below a relatively narrow neck 79 to act as a guide for shaft 72. As first end 74 of handle 70 is inserted into open end 54 of tube 50, first end 74 aligns with bulge 56 of tube 50. In a particular embodiment, sleeve 78 has a diameter larger than that of tube 50 and is positioned along shaft 72 to act as a stop for shaft 72. That is, sleeve 78 may be situated so that when it abuts open end 54 of tube 50, first end 74 of handle 70 is adjacent bulge 56. End 74 is made of an expandable material, such as rubber or plastic. In other forms, end 74 may be made of different materials. Handle 70 also includes a through bolt 80 as shown in FIG. 5. Bolt 80 extends from first end 74, where it connects to a washer or disc 83, to second end 76. At or proximate to second end 76 is a wing nut 82 attached to through bolt 80. As wing nut 82 is rotated, it draws through bolt 80 to compress first end 74 between disc 83 and shaft 72 along a longitudinal axis 81 of shaft 72, thereby expanding end 74 in a radial direction relative to longitudinal axis 81. As first end 74 expands radially within bulge 56, they form a firm connection or seal. Handle 70 is now firmly or tightly positioned within candle 60, thereby providing a mechanism to carry or hold candle 60.

The user can hold handle 70, or a strap 84 or other holding structure attached to handle 70, and thereby carry or hold candle 60. In one form, the user carries candle 60 by strap 84 and alternately dips candle 60 into separate containers of melted, colored wax and room temperature water. Since the temperature of candle 60 is lower than that of the melted wax, some of the melted wax hardens into a layer around candle 60 before it is withdrawn from the melted wax. As candle 60 is dipped into the water, the surface of candle 60 is cooled so that it will pick up another layer of wax on the next wax dip. In one form, this process of alternately dipping in wax and water is continued until up to 15 to 30 or more layers of wax have collected on candle 60. Candle 60, which is now softened by the dips in the melted wax, is now ready for carving. For a user to more easily carve candle 60, it can be positioned in a carving rack 90.

Figure 6:
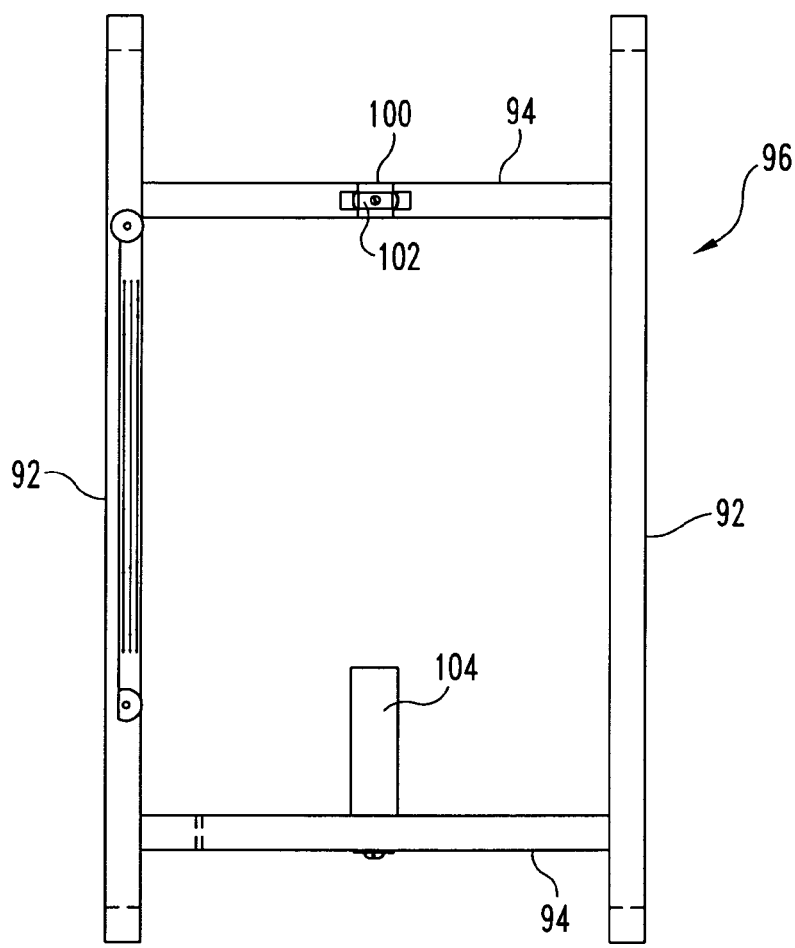
FIG. 6 is a front plan view of an embodiment of a carving rack.
Figure 7:
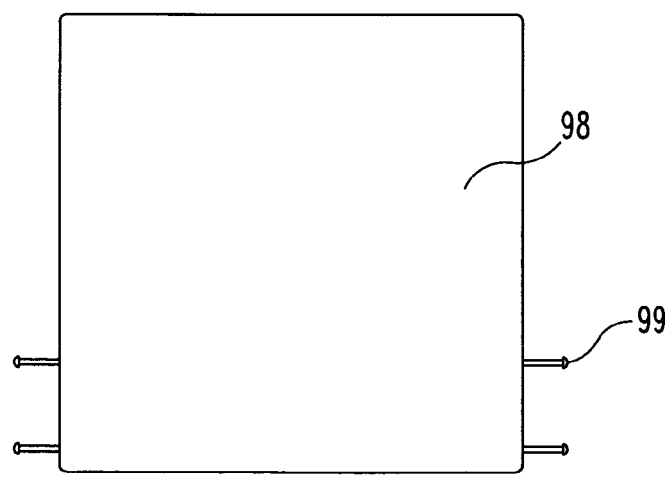
FIG. 7 is a top plan view of an embodiment of a carving rack base.

As shown in FIG. 6, the illustrated embodiment of carving rack 90 includes a pair of side pieces 92 connected to a pair of cross pieces 94. Side pieces 92 and cross pieces 94 form a frame 96 which can be attached to a base 98 (FIG. 7). Base 98 may be rectangular in shape; however, in other forms base 98 can have a different shape such as triangular or circular. In one form, base 98 has a length of 9⅞ inches and a width of 9⅞ inches and is cut from ¾ inch plywood. In this form, two pairs of screws 99 are attached to the sides of base 98 to receive side pieces 92 and to hold the frame 96 in an upright fashion. In other forms base 98 may have bosses or guides different from screws 99, and/or frame 96 may be attached differently to the base 98.

In the illustrated embodiment, frame 96 is reversible such that a user can remove frame 96 from base 98, rotate frame 96 approximately 180° about a horizontal axis 101, and remount frame 96 on base 98. Generally, it has been found to be much easier for a user to carve a candle using downward strokes; therefore, by rotating frame 96 and candle 60 mounted therein, the user can carve candle 60 solely with downward strokes if desired. One cross piece 94 includes a notch 100 with a U-shaped holder or clamp 102 mounted within notch 100. The other cross piece 94 includes a peg or protrusion 104. Notch 100 is sized to receive a portion of handle 70 as described in more detail below. As handle 70 is inserted into notch 100, the branches of clamp 102 will give or flex, essentially acting as leaf springs, to allow neck portion 79 of handle 70 to nestle within clamp 102 and additionally allow handle 70 to be rotated or turned about its vertical axis. Notch 100 and protrusion 104 may align with each other as shown in FIG. 6. Protrusion 104 can be sized and configured to receive bottom end 64 of candle 60, which may have an indentation as described above. To place candle 60 into rack 90, the center of bottom end 64 of candle 60 is positioned over protrusion 104 and handle 70 is positioned near notch 100. Handle 70 is then pushed into clamp 102 in notch 100.

Figure 8:
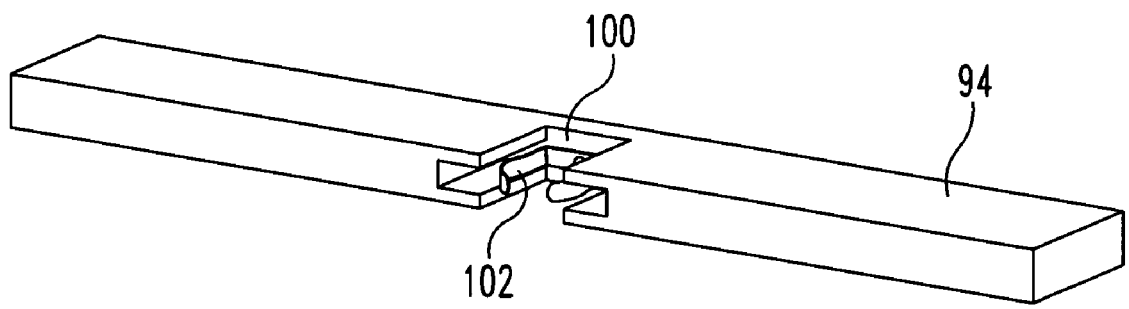
FIG. 8 is a perspective view of the embodiment of the rack top crosspiece shown in FIG. 6.

As shown in FIG. 8, notch 100 has a rectangular shape; however, in other embodiments, notch 100 may be shaped differently. Also shown in FIG. 8 is clamp 102 mounted within notch 100. As should be appreciated, in other embodiments a different clamp, holder, or fastener may replace clamp 102 or its leaf spring action.

Figure 9:
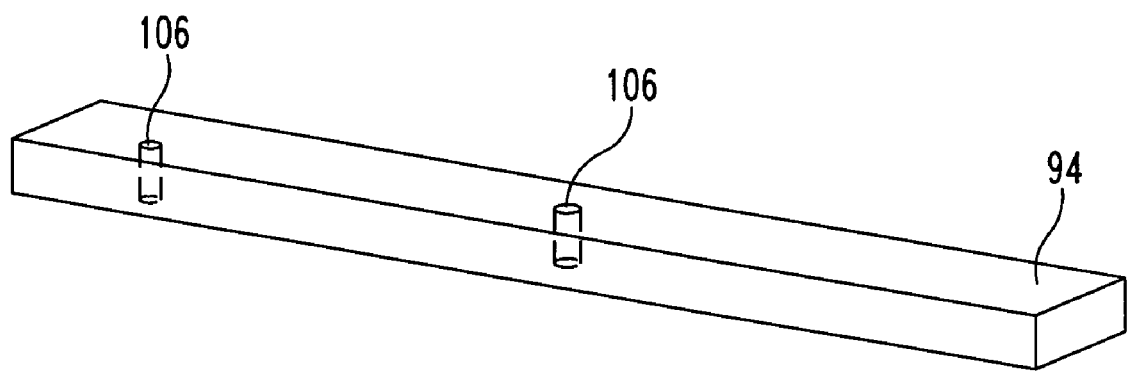
FIG. 9 is a perspective view of the embodiment of the rack bottom crosspiece shown in FIG. 6.

As shown in FIG. 9, one of cross pieces 94 includes a pair of holes 106. In other forms, the other cross piece 94 may include additional holes. As shown, the center hole is positioned to receive peg or protrusion 104. Another hole 106 is positioned to receive a candle-shaping tool as described below. In one form, the length of each of the cross pieces 94 is 10 inches, and may be of different sizes in other embodiments.

Figure 10:
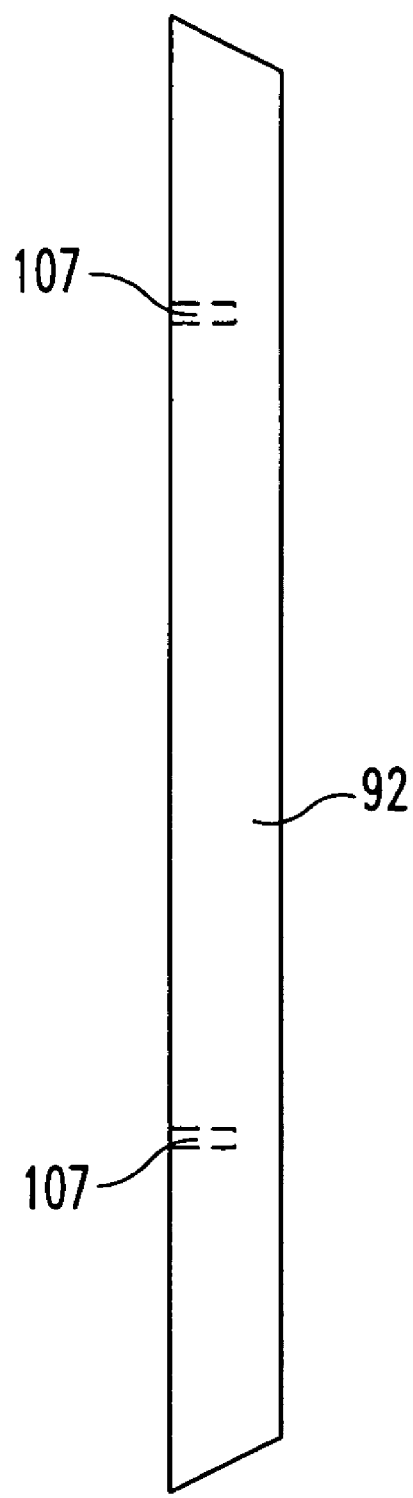
FIG. 10 is a side view of the embodiment of the rack sidepiece shown in FIG. 6.

As shown in FIG. 10, at least one of side pieces 92 includes a pair of holes 107. Holes 107 can be sized to receive a fastener for a marking strip 108 as described in more detail below.

In another embodiment, rack 90 can be constructed essentially as described above, and connected to base 98 via a lazy-susan or other rotating mechanism in order to enable the turning over of candle 60. In such an embodiment, one or more of side pieces 92 or cross pieces 94 may be connected, directly or via a connecting bar, to a plate or disc. The plate may be part of a lazy-susan mechanism, e.g. rotatably connected via an axle and bearings in a channel or track to a second plate or disc, which second plate is connected to base 98. Anchoring mechanisms, such as hooks, latches and/or pins, may be attached to one or both plates and/or to base 98 so as to prevent rotation of one plate with respect to another once the user has positioned candle 60 in a desired orientation for carving. In this way, a full 360 degree range of orientation can be achieved by rack 90 for the user's convenience during the carving process.

Figure 13:
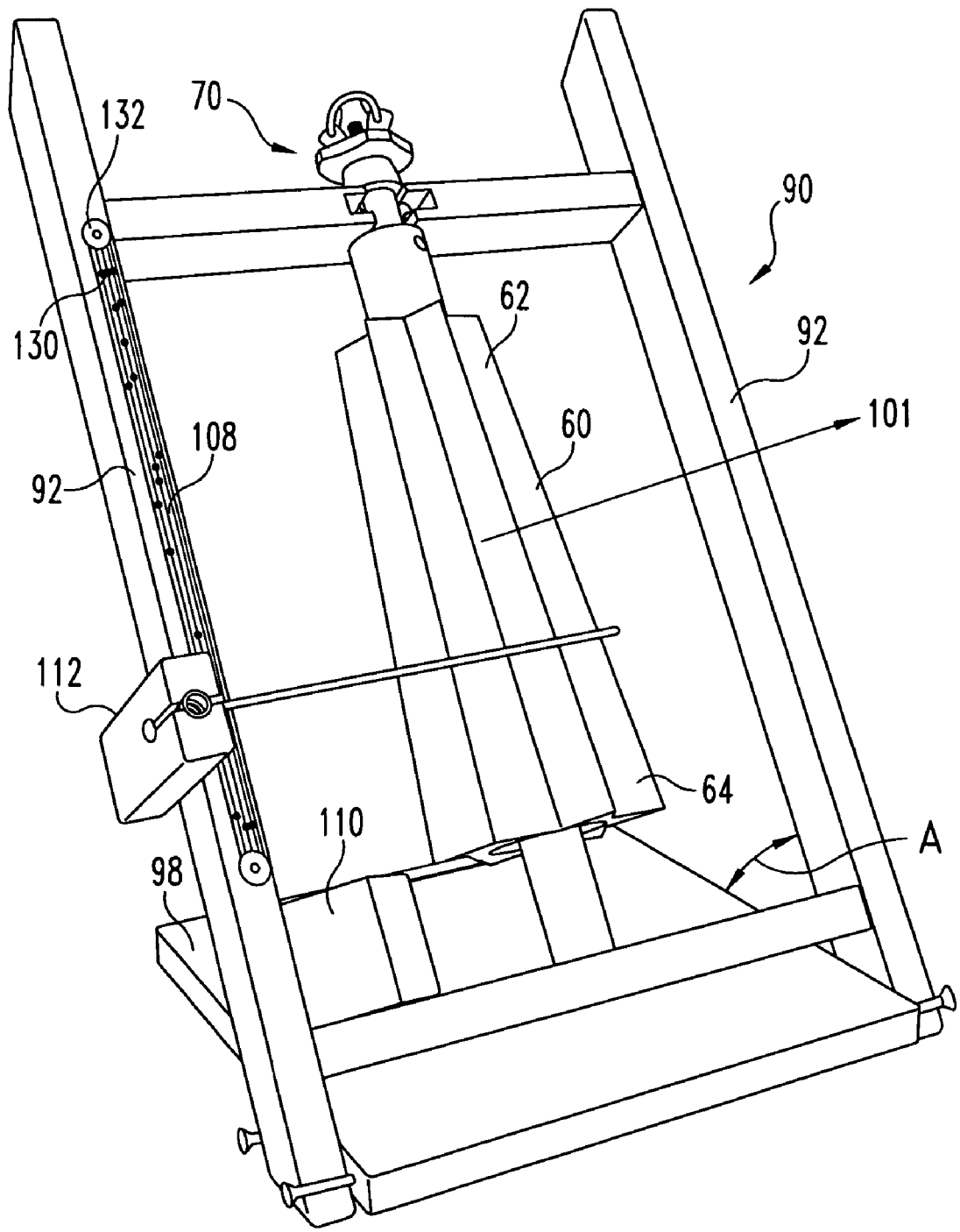
FIG. 13 is a perspective view of the embodiment shown in FIG. 6 mounted on the embodiment shown in FIG. 7 and additional structure.

In particular embodiments of rack 90, frame 96 can be connected to base 98 so that frame 96 is substantially perpendicular to base 98 (i.e. vertical) or forms an angle of about 45 degrees or more with base 98. The embodiment shown in FIG. 13 shows an angle A of about 60 degrees between frame 96 and base 98. In the embodiment of rack 90 in which frame 96 is attached to a lazy-susan mechanism, frame 96 and the two plates of the mechanism may be at similar angles with respect to base 98.

Figure 11:
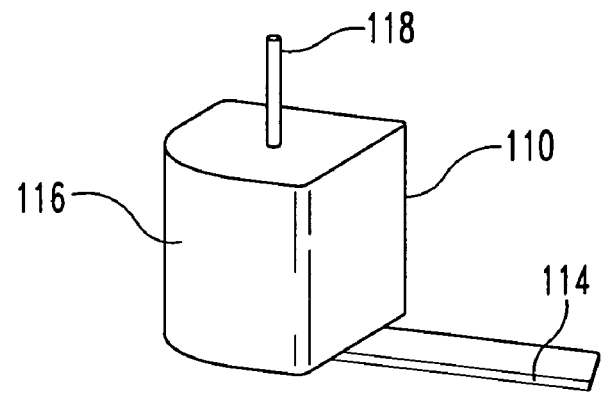
FIG. 11 is a perspective view of an embodiment of a candle bottom cutting knife.

Candle-shaping tools such as a cutting tool 110 (FIG. 11) and a marking tool 112 (FIG. 12) can be attached to either of the pair of side pieces 92 or the pair of cross pieces 94. As shown in FIG. 11, one embodiment of cutting tool 110 includes a blade 114 mounted to a base 116. The base 116 has an alignment pin 118 mounted thereto. Alignment pin 118 is sized to fit at least partially in hole 106 of cross piece 94. As shown in FIG. 13, cutting tool 110 can be positioned in rack 90 to trim bottom end 64 of candle 60 mounted therein. As a user rotates handle 70 and candle 60, blade 114 cuts or trims drippings from bottom end 64 to form an even bottom surface of candle 60. If desired, the user can remove cutting tool 110 from rack 90 following use.

Figure 12:
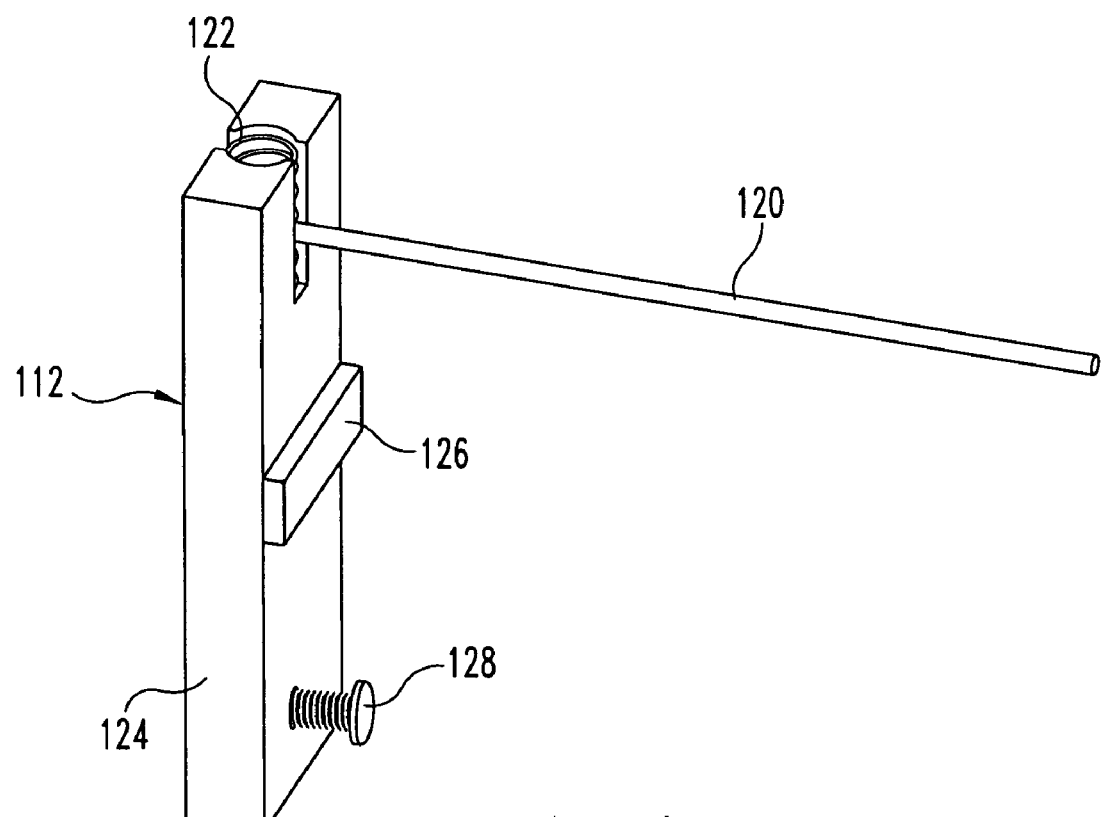
FIG. 12 is a perspective view of an embodiment of a marking tool.

Marking tool 112, in the illustrated embodiment, includes a marking needle 120 attached to a spring 122 mounted in a base 124. Needle 120 may be fitted between coils of spring 122, so that needle 120 does not touch a candle on rack 90 without being pushed by the user, and so that if the user pushes too hard on needle 120, spring 122 will absorb some or most of that force to lessen the chance of a large dent being formed in the candle. Attached to base 124 is a guide piece 126 and a hook member 128 (e.g. a screw with a head) for mounting marking tool 112 on a side piece 92. Marking tool 112 mounted on rack 90 is shown in FIG. 13. Referring to FIG. 12, the illustrated embodiment of marking needle 120 has a length to extend to at least peg or protrusion 104 of rack 90. In this form, marking needle 120 can touch candle 60.

To mount marking tool 112 onto cross piece 94, marking tool 112 is held so that marking needle 120 is at the top of marking tool 112. Next, hook 128 is hooked onto or around the side of rack 90 or one of the cross pieces 94. Base 124 of marking tool 112 is pressed against cross piece 94 so that guide piece 126 of marking tool 112 is just to the left of marking strip 108. Hook member 128 could be flexible so that while marking tool 112 is being pushed against the side of rack 90, guide piece 126 will slip past the edge of the side of rack 90 under tension. The user may feel a snap when marking tool 112 has been properly secured around the side of rack 90. Marking tool 112 can be moved up and down the side of rack 90. Marking tool 112 can be used with marking strip 108, described below, for consistency in marking candle 60 with small indentations, by aligning the upper end of guide piece 126 with a dot 130 on marking strip 108. After marking tool 112 is aligned with dot 130, the user can press marking needle 120 into candle 60 to form an indentation. Next, the user can turn candle 60 with handle 70 and continue marking candle 60 at additional places or on all sides, until indentations are made as appropriate a particular or desired candle design.

As shown in FIG. 13, marking strip 108 is mounted onto a side piece 92. However, in different embodiments marking strip(s) 108 can be mounted to various parts of either or both side pieces 92. Marking strip 108 includes guide elements or dots 130 that can be aligned with marking needle 120 of marking tool 112. Marking strip 108 is mounted to a side piece 92 with a pair of marking plugs 132 in holes 107, in the illustrated embodiment. Plugs 132 are inserted through marking strip 108 into holes 107. In other embodiments, marking strip 108 may be attached to side piece 92 via adhesives, hook-and-loop fastener, or in other ways. Further, marking strip 108 may contain additional guide dots 130 for more than one candle design. Dots 130 may be colored, designed, placed or otherwise differentiated so that dots 130 with shared characteristics (e.g. red color or connected by a vertical line) correspond to a particular candle design.

Figure 14:
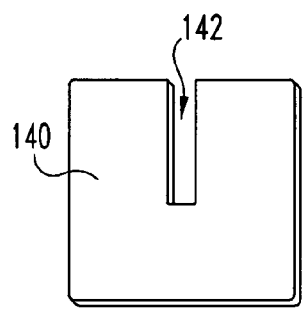
FIG. 14 is a top plan view of an embodiment of a shim.

As shown in FIG. 14, a shim 140 can be used between cutting tool 110 and a cross piece 94 to elevate the position of blade 114 relative to bottom end 64 of candle 60. Shim 140 may include a slot 142 sized to receive alignment pin 118 of cutting tool 110. Shim 140 is rectangular in shape in the illustrated embodiment; however, in other forms shim 140 may be shaped differently. Additionally, more than one shim 140 can be positioned between cutting tool 110 and cross piece 94.

Figure 15:
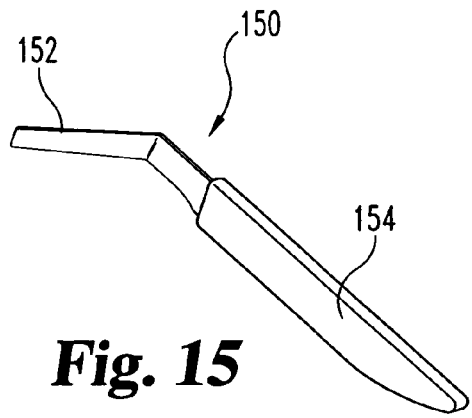
FIG. 15 is a perspective view of an embodiment of a carving knife.

After indentation marks, if any, for a particular candle design are made on candle 60, marking tool 112 (if present) may be removed from rack 90. Candle 60, relatively soft and connected to rack 90 as discussed above, can be carved. As shown in FIG. 15, a carving knife 150 having a blade 152 and a handle 154 is shown. Knife 150 can be used to make cuts into candle 60 using indentation marks (if any have been made) as beginning points for the cuts. Such cuts usually result in a slice or strip of wax cut away from the candle 60 completely or left partially attached to the candle 60. The slice or strip of wax can be twisted, folded, rolled, or otherwise formed or shaped and placed back against the candle 60 to create a desired design. In some candle designs, it is desirable to make an upward cut on the candle 60, i.e. a cut that moves toward bottom end 64 of candle 60. However, it has been found that cutting upward accurately or skillfully can be difficult. If upward cutting is desired, the user can rotate rack 90 by 180° about horizontal axis 101 and remount it to base 98 so that candle 60 is turned upside down. The user is then able to make somewhat easier downward strokes to create cuts seen as "upward" in the finished product. The user may cut a continuous circle around top end 62 of candle 60 where handle 70 enters open end 54 of tube 50. Such a cut may be made so that handle 70 can be removed without creating a ragged edge on top end 62 of candle 60. After the carving is finished, candle 60 is allowed to harden or cure.

Figure 16:
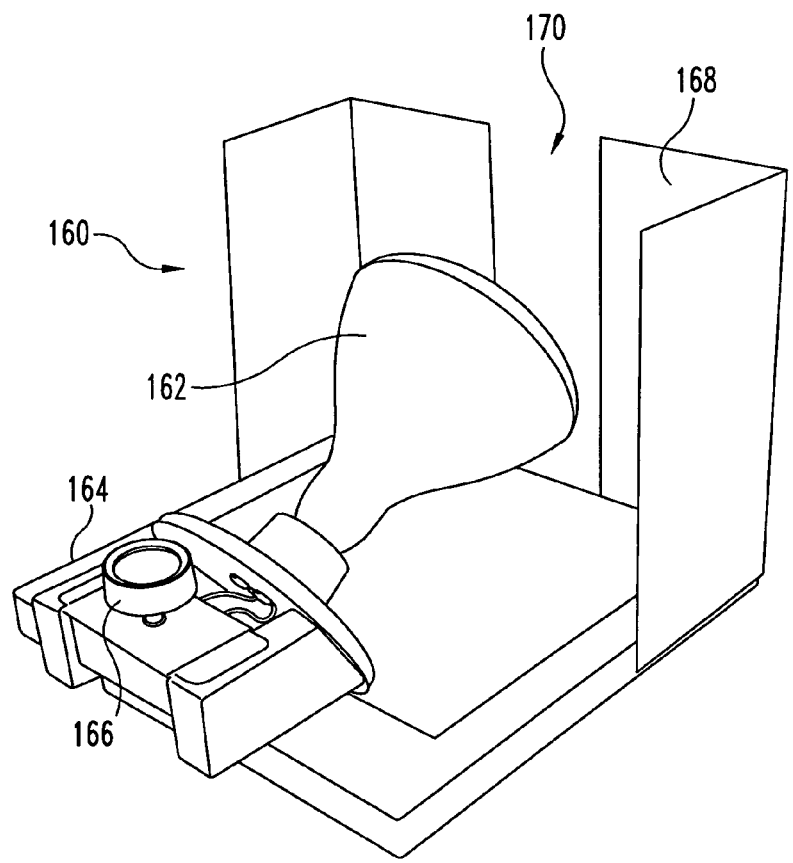
FIG. 16 is a perspective view of an embodiment of a candle warmer.

As shown in FIG. 16, a candle warmer 160 can be provided with rack 90 in some embodiments, and may include a heating element 162 attached to a base 164 and a switch 166. Attached to base 164 is a pair of guide plates 168 that form a slot 170 between them. Heating element 162 may be an infrared lamp aligned with slot 170. In use, heating element 162 is positioned near candle 60 to warm the wax. Slot 170 focuses heat energy from heating element 162 onto the back of candle 60 to warm that part of candle 60 and maintain its relative softness while a user takes the time to carve a front portion of candle 60. Guide plates 168 may be positioned to block energy from heating element 162 thereby shielding the user from at least some of that energy. Switch 166 can operate to turn heating element 162 on or off or to dim heating element 162. Candle warmer 160 can be attached to rack 90 or adjacent to it, or otherwise positioned to maintain candle wax in a relatively soft, carvable state.

Candle 60 can be allowed to cool, harden or cure on rack 90 following completion of carving. After candle 60 has hardened, a step of dipping candle 60 in a candle glaze can be performed if desired. If that step is used, a waiting period is needed for the glaze to dry, and candle 60 can be placed on rack 90 as described above for that period. After candle 60 has cooled and, if it was glazed, the glaze is allowed to dry, handle 70 is removed from candle 60. Nut 82 is turned to push out bolt 80 and allow end 74 to extend longitudinally and contract radially away from bulge 56 in tube 50. Fuel, such as lamp or other oils, can be placed in tube 50 for burning.

Figure 17:
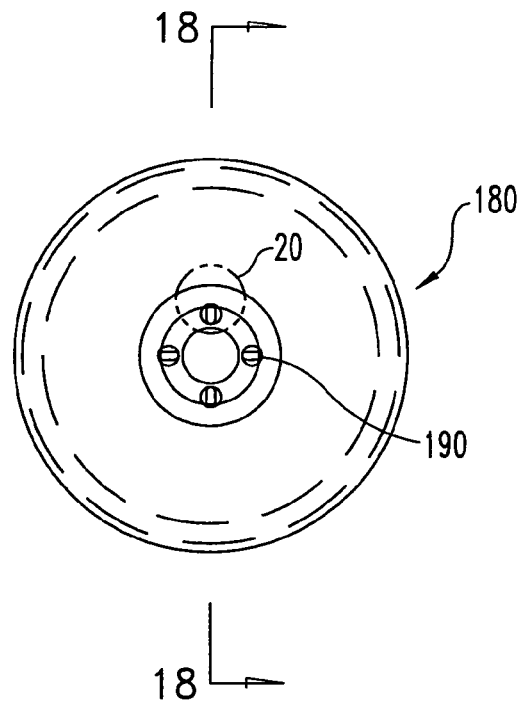
FIG. 17 is a top plan view of an embodiment of a wick holder.
Figure 18:
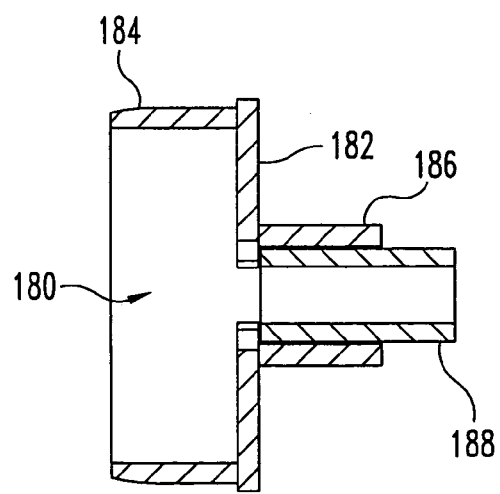
FIG. 18 is a cross-section view of the embodiment shown in FIG. 17, taken along line 18-18 in FIG. 17 and viewed in the direction of the arrows.
Figure 19:
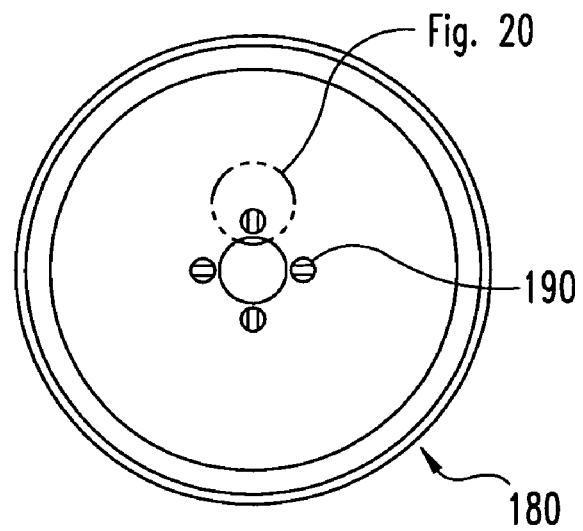
FIG. 19 is a bottom plan view of the embodiment shown in FIG. 17.
Figure 20:
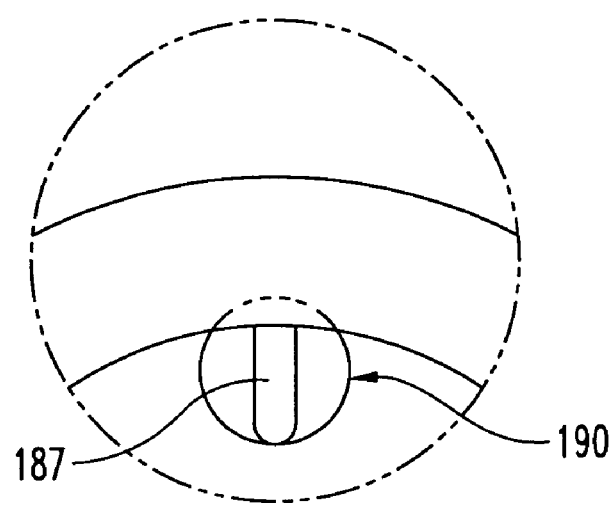
FIG. 20 is a partial bottom plan view of the embodiment shown in FIG. 19 enlarged to show detail.

An embodiment of a wick holder 180 is shown in FIG. 17. Wick holder 180 is inserted into open end 54 of tube 50. Wick holder 180 includes a cap 182 with a continuous lip 184 extending therefrom. Wick holder 180 also includes a raised ring 186 as shown in FIG. 18. Ring 186 may include one or more internal ribs 187 that are at least slightly compressible, to accommodate and secure various sizes of plug 188. Plug 188 is tubular and made of a fireproof or heat-resistant material such as borosilicate glass. Wick holder 180 may be transparent or translucent and of materials such as plastic, borosilicate glass or others, and may be sized to fit relatively snugly within open end 54 of tube 50. As shown in FIG. 19, wick holder 180 can also include four vents 190. In other forms, wick holder 180 can omit or include a different number of vents 190. FIG. 20 shows an enlarged view of a vent 190, which has a substantially round shape.

A wick (not shown) extends through plug 188 and into tube 50. In a particular embodiment, a fiberglass wick is inserted through plug 188 into the tube 50 and is wetted all the way to the top with fuel within tube 50. After the wick is saturated with fuel, it can be lit. In a darkened room, wick holder 180 and tube 50 which holds fuel allows light from the lighted wick to shine down into the candle 60 and out through cuts in candle 60, creating a pleasing visual effect. Vents 190 allow gas exchange between the interior and exterior of tube 50.

It will be understood that natural or synthetic materials other than wax might be used to make candle 60. Examples may be certain types of polymers or plastics or other substances or compounds that would take the shape of a mold while remaining sufficiently soft to carve. While the term "wax" has been used above in various places to refer to an example of a substance that may be used for candle 60, it is intended that the disclosure herein can be applied to any substance that can be used in a similar manner to that described above.

While the invention has been illustrated and described in detail in the drawings and foregoing description, the same is to be considered as illustrative and not restrictive in character, it being understood that all changes and modifications that come within the spirit of the invention are desired to be protected.

What is claimed is:

1. A method of making a candle, comprising:
   providing a candle mold having one or more walls attached to a base and a peg attached to the base within the one or more walls;
   mounting a tube with an expanded midsection onto said peg, wherein said tube includes an open end and a closed end;
   forming a sealed connection between said open end of said tube and said peg;
   placing a quantity of candle matter into said mold to contact said tube;
   removing said candle matter with said tube within said candle matter from said mold;
   inserting a handle into said tube; and
   forming a connection between said handle and said tube sufficiently tight to enable holding said candle matter by said handle.

2. The method of claim 1, further comprising connecting said handle with said candle matter to a candle carving rack.

3. The method of claim 2, further comprising:
   rotating said candle carving rack substantially about a horizontal axis of said carving rack.

4. The method of claim 2, wherein said rack includes:
   at least one sidepiece;
   at least one crosspiece connected with said at least one sidepiece to form a frame, said frame being configured to demountably retain a candle shaping tool, said at least one crosspiece being configured to demountably and rotatably retain said candle;
   a base configured for reversibly mounting said frame.

5. The method of claim 4, wherein said base is adapted for rotation of said frame, said frame and said base having an included angle of between about 45 degrees and about 90 degrees.

6. The method of claim 1, further comprising:
   cutting said candle matter with a blade.

7. The method of claim 1, further comprising:
   forming at least one mark on said candle matter with a marking tool.

8. The method of claim 1, further comprising:
   rotating said handle about a longitudinal axis to expose said candle matter to a candle shaping tool.

9. The method of claim 1, further comprising:
   heating at least a portion of said candle matter with a heating element.

10. The method of claim 1, further comprising:
    adding a quantity of fuel into said tube, and placing a wick holder made of a heat-resistant material, said wick holder having a wick connected thereto, into said tube.

11. The method of claim 1, wherein:
    said walls and said base are configured to receive and retain said quantity of candle matter;

said peg having a first end and an opposite second end, said first end being positioned within said one or more walls;

said tube sized to removably mount onto said peg; and said forming said sealed connection occurs between said open end of said tube and first end of said peg.

12. The method of claim 1, wherein said handle includes a shaft having a first end that is radially expandable and a second end, and further comprising inserting said handle into said tube and expanding said first end radially into contact with said candle matter.

13. The method of claim 12, wherein said handle includes a nut proximate to said second end, a disc proximate to said first end, and a bolt extending from said nut to said disc, and wherein said expanding includes turning said nut to cause the distance between said nut and said disc to decrease.

14. A method of making a candle, comprising:

providing a candle mold having one or more walls attached to a base and a peg attached to the base within the one or more walls;

mounting a tube onto said peg, wherein said tube includes an open end and a closed end;

forming a sealed connection between said open end of said tube and said peg;

placing a quantity of candle matter into said mold to contact said tube; and removing said candle matter with said tube within said candle matter from said mold.

15. The method of claim 14, further comprising heating at least a portion of said candle matter with a heating element.

16. The method of claim 14, further comprising:

adding a quantity of fuel into said tube, and placing a wick holder made of a heat-resistant material, said wick holder having a wick connected thereto, into said tube.

17. The method of claim 14, further comprising connecting a handle with said tube to enable holding said candle matter by said handle.

18. The method of claim 17, further comprising rotating said handle about a longitudinal axis to expose said candle matter to a candle shaping tool.

19. The method of claim 17, wherein said handle has an end and a hanger proximate said end.

20. The method of claim 17, wherein said handle includes a shaft having a first end that is radially expandable and a second end, and further comprising inserting said handle into said tube and expanding said first end radially into contact with said candle matter.

21. The method of claim 20, wherein said handle includes a nut proximate to said second end, a disc proximate to said first end, and a bolt extending from said nut to said disc, and wherein said expanding includes turning said nut to cause the distance between said nut and said disc to decrease.

22. The method of claim 20, wherein said candle matter includes an internal bulge, and said expanding includes expanding said first end into said bulge.

23. The method of claim 17, further comprising connecting said handle with said candle matter to a candle carving rack.

24. The method of claim 23, wherein said rack includes:

at least one sidepiece;

at least one crosspiece connected with said at least one sidepiece to form a frame, said frame being configured to demountably retain a candle shaping tool, said at least one crosspiece being configured to demountably and rotatably retain said candle matter;

a base configured for reversibly mounting said frame.

25. The method of claim 24, wherein said base is adapted for rotation of said frame, said frame and said base having an included angle of between about 45 degrees and about 90 degrees.

26. The method of claim 24, wherein said rack includes a marking strip attached to said at least one sidepiece.

27. The method of claim 26, wherein said marking strip includes at least one guide element for marking said candle matter.

28. The method of claim 24, wherein said at least one crosspiece is configured to receive a candle holder.

29. The method of claim 24, wherein said candle shaping tool is one of a marking tool configured to form at least one mark on said candle matter and a cutting tool configured to cut said candle matter.

* * * * *